(12) United States Patent
Underwood et al.

(10) Patent No.: US 8,944,437 B2
(45) Date of Patent: Feb. 3, 2015

(54) SEAL BETWEEN METAL AND CERAMIC CONDUITS

(71) Applicant: Air Products and Chemicals, Inc., Allentown, PA (US)

(72) Inventors: Richard Paul Underwood, Allentown, PA (US); Stephen Clyde Tentarelli, Schnecksville, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 132 days.

(21) Appl. No.: 13/707,024

(22) Filed: Dec. 6, 2012

(65) Prior Publication Data

US 2014/0138921 A1 May 22, 2014

(30) Foreign Application Priority Data

Nov. 16, 2012 (EP) .................................... 12193093

(51) Int. Cl.

| | |
|---|---|
| *F16J 15/10* | (2006.01) |
| *F16L 25/00* | (2006.01) |
| *C04B 37/02* | (2006.01) |
| *H01M 8/02* | (2006.01) |
| *C04B 35/645* | (2006.01) |
| *H01M 8/12* | (2006.01) |

(52) U.S. Cl.
CPC .......... *F16L 25/0072* (2013.01); *C04B 37/025* (2013.01); *C04B 37/026* (2013.01); *H01M 8/0282* (2013.01); *H01M 8/0276* (2013.01); *C04B 35/645* (2013.01); *H01M 2008/1293* (2013.01); *C04B 2237/062* (2013.01); *C04B 2237/08* (2013.01); *C04B 2237/086* (2013.01); *C04B 2237/10* (2013.01); *C04B 2237/12* (2013.01); *C04B 2237/125* (2013.01); *C04B 2237/34* (2013.01); *C04B 2237/405* (2013.01); *C04B 2237/406* (2013.01); *C04B 2237/592* (2013.01); *C04B 2237/708* (2013.01); *C04B 2237/72* (2013.01); *C04B 2237/80* (2013.01); *Y02E 60/50* (2013.01); *Y02E 60/525* (2013.01); *Y10S 277/938* (2013.01)
USPC ........................................... 277/650; 277/938

(58) Field of Classification Search
USPC .......... 277/628, 650, 654, 936–938, 942, 943
See application file for complete search history.

(56) References Cited

U.S. PATENT DOCUMENTS

| | | | |
|---|---|---|---|
| 5,750,279 A | 5/1998 | Carolan et al. | |
| 6,399,204 B1 * | 6/2002 | Shekleton et al. | 428/408 |
| 6,547,286 B1 * | 4/2003 | White et al. | 285/354 |
| 6,821,667 B2 | 11/2004 | England et al. | |
| 7,222,406 B2 | 5/2007 | Chou et al. | |
| 7,252,902 B2 | 8/2007 | Bram et al. | |

(Continued)

FOREIGN PATENT DOCUMENTS

GB 2284867 A 6/1995

OTHER PUBLICATIONS

Fergus, Jeffrey W., "Sealants for solid oxide fuel cells," Journal of Power Sources, Elsevier SA, CH, vol. 147, No. 1-2, Sep. 9, 2005, pp. 46-57.

*Primary Examiner* — Gilbert Lee
(74) *Attorney, Agent, or Firm* — Bryan C. Hoke, Jr.

(57) ABSTRACT

A seal between a ceramic conduit and a metal conduit of an ion transport membrane device consisting of a sealing surface of ceramic conduit, a sealing surface of ceramic conduit, a single gasket body, and a single compliant interlayer.

16 Claims, 2 Drawing Sheets

(56) References Cited

U.S. PATENT DOCUMENTS

| | | |
|---|---|---|
| 7,794,894 B2 | 9/2010 | Chou et al. |
| 7,832,737 B2 | 11/2010 | Chou et al. |
| 8,240,677 B2 * | 8/2012 | Browne et al. ............ 277/628 |
| 8,400,730 B2 * | 3/2013 | Uranaka et al. ........... 360/99.22 |
| 2003/0203267 A1 | 10/2003 | Chou et al. |
| 2004/0048137 A1 | 3/2004 | Chou et al. |
| 2005/0200124 A1 * | 9/2005 | Kleefisch et al. ......... 285/290.1 |
| 2005/0206096 A1 * | 9/2005 | Browne et al. ............ 277/628 |
| 2007/0125425 A1 | 6/2007 | Carolan et al. |
| 2008/0118803 A1 | 5/2008 | Dekker et al. |
| 2008/0260455 A1 | 10/2008 | Carolan et al. |
| 2009/0311570 A1 | 12/2009 | Chou et al. |

* cited by examiner

SEAL BETWEEN METAL AND CERAMIC CONDUITS

STATEMENT REGARDING FEDERALLY SPONSORED RESEARCH OR DEVELOPMENT

This invention was made at least in part with funding from the United States Department of Energy under DOE Cooperative Agreement No. DE-FC26-98FT40343. The United States Government has certain rights in this invention.

CROSS-REFERENCE TO RELATED APPLICATIONS

This application claims priority to European Patent Application EP12193093.7, filed Nov. 16, 2012, incorporated herein by reference.

BACKGROUND

Ion transport membrane devices require metal conduit to ceramic conduit transitions. Typically, the ceramic ion transport membrane device will need to be coupled to a metallic piping system to convey the permeate side product to the next process operation. It is neither economically nor mechanically practical to use the same ceramic material for this piping system as is used in the membranes. The transition from metal to ceramic must remain sufficiently leak-free in spite of substantial changes in operating temperature, pressure, and gas composition. Thus, a seal between the metal conduit and the ceramic conduit is required that will accommodate the large differences in coefficients of thermal expansion and chemical expansion, and also provide robust performance over long periods of operation at temperatures in excess of 800° C. and pressures of up to about 2.5 MPa (absolute) (350 psig), the pressure difference providing a compressive force on the seal. The seal must be able to provide sealing at both high pressure and low pressure. It is also necessary that the seal components in contact with the metal and ceramic parts be chemically compatible with these parts.

While particularly suited for ion transport membrane devices, the seal between a ceramic part and a metal part described herein may find applicability to other technologies that operate at similar temperatures and pressures and require sufficiently leak-free sealing.

U.S. Pat. No. 7,222,406, incorporated herein by reference, discloses multi-layer seals in which a gasket body with compliant interlayers positioned adjacent each side of the gasket body; the gasket body is sandwiched between two compliant interlayers.

However, issues can arise when a compliant interlayer is in contact with the ceramic. Adhesion of the compliant interlayer to the ceramic can lead to mechanical stresses in the ceramic and possible breakage. Chemical reaction between the compliant interlayer and the ceramic or diffusion of the compliant interlayer into the ceramic can lead to undesirable property changes of the ceramic.

Industry desires a seal between ceramic conduits and metal conduits that are sufficiently leak-tight and durable.

BRIEF SUMMARY

The present invention relates to a seal between a ceramic conduit and a metal conduit, for example, for use in an ion transport membrane device.

There are several aspects of the seal as outlined below.

Aspect 1. A seal comprising:
a sealing surface of the ceramic conduit;
a sealing surface of the metal conduit;
a gasket body defining a first surface and a second surface, the second surface opposing the first surface, the first surface of the gasket body directly contacting the sealing surface of the ceramic conduit; and
a compliant interlayer disposed between the second surface of the gasket body and the sealing surface of the metal conduit, the compliant layer directly contacting the sealing surface of the metal conduit;
wherein the gasket body comprises a mineral selected from the group consisting of mica, vermiculite, montmorillonite, graphite, and hexagonal boron nitride; and
wherein the compliant interlayer comprises a material selected from the group consisting of a glass, a glass-ceramic, a glass composite, a cermet, a metal, a metal alloy, and a metal composite.

Aspect 2. A seal consisting of:
a sealing surface of the ceramic conduit;
a sealing surface of the metal conduit;
a single gasket body defining a first surface and a second surface, the second surface opposing the first surface, the first surface of the gasket body directly contacting the sealing surface of the ceramic conduit; and
a single compliant interlayer disposed between and directly contacting the second surface of the gasket body and the sealing surface of the metal conduit;
wherein the gasket body comprises a mineral selected from the group consisting of mica, vermiculite, montmorillonite, graphite, and hexagonal boron nitride; and
wherein the compliant interlayer comprises a material selected from the group consisting of a glass, a glass-ceramic, a glass composite, a cermet, a metal, a metal alloy, and a metal composite.

Aspect 3. The seal of aspect 1 or 2 wherein the gasket body comprises at least 95 weight % of a mineral selected from the group consisting of mica, vermiculite, montmorillonite, graphite, and hexagonal boron nitride.

Aspect 4. The seal of any one of aspects 1 to 3 wherein the gasket body is mica paper, vermiculite paper, talc-infiltrated vermiculite paper, or boron nitride sheet.

Aspect 5. The seal of any one of aspects 1 to 4 wherein the compliant interlayer does not contact the sealing surface of the ceramic component.

Aspect 6. The seal of any one of aspects 1 to 5 wherein the first surface of the gasket body is at least essentially parallel the second surface of the gasket body.

Aspect 7. The seal of any one of aspects 1 to 6 wherein the gasket body has a thickness of 0.025 mm to 0.26 mm.

Aspect 8. The seal of any one of aspects 1 to 7 wherein the compliant interlayer is a metal comprising at least 95 weight % of gold, silver, palladium, or alloys thereof.

Aspect 9. The seal of any one of aspect 1 to 7 wherein the compliant interlayer comprises at least 95 weight % of the glass, or the glass-ceramic.

Aspect 10. The seal of any one of aspects 1 to 9 wherein the compliant interlayer has a thickness of 0.025 mm to 1.27 mm prior to heating.

Aspect 11. The seal of any one of aspects 1 to 10 wherein the gasket body separates the sealing surface of the ceramic conduit from the compliant interlayer.

Aspect 12. The seal of any one of aspects 1 to 11 wherein the gasket body is a shear layer or slip layer that possesses the characteristic of lubricity or is a sheet-like structure comprising sheets or flakes which can be displaced relative to one another in directions which are at least essentially parallel to the sheets or flakes.

Aspect 13. The seal of any one of aspects 1 to 12 wherein the ceramic conduit is constructed of one or more single phase multicomponent metal oxides and/or of one or more multiphase composite materials.

DETAILED DESCRIPTION

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used. The adjective "any" means one, some, or all indiscriminately of whatever quantity. The term "and/or" placed between a first entity and a second entity means one of (1) the first entity, (2) the second entity, and (3) the first entity and the second entity. The term "and/or" placed between the last two entities of a list of 3 or more entities means at least one of the entities in the list including any specific combination of entities in this list.

As used herein, "first," "second," "third," etc. are used to distinguish from among a plurality of steps and/or components and/or features, and is not indicative of the relative position in time and/or space.

Where a weight % value is presented, this value is the fraction of the total weight of the respective component e.g. the gasket body or the compliant layer.

The present invention relates to a seal between a ceramic conduit and a metal conduit in an ion transport membrane device.

Figure 1:
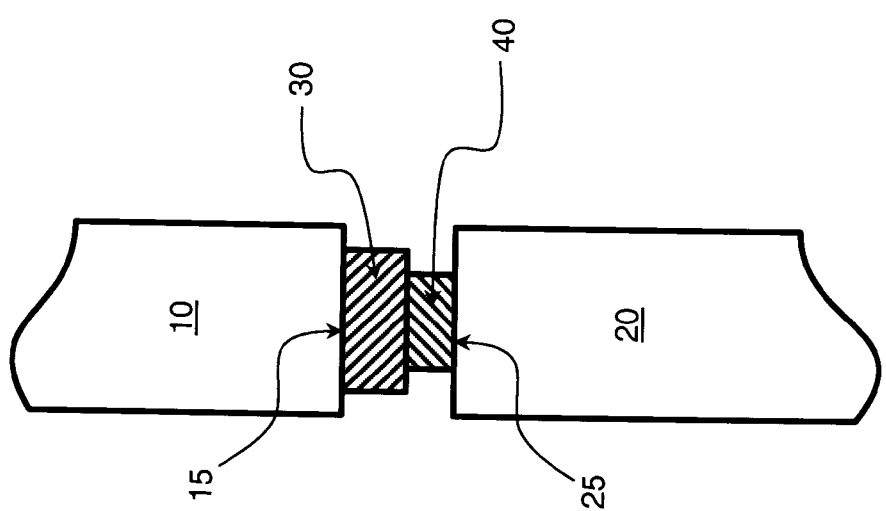
FIG. 1 is a cross-section through the conduits, gasket, and compliant interlayer.

The seal is described with reference to FIG. 1.

The seal consists of a sealing surface 15 of ceramic conduit 10, a sealing surface 25 of metal conduit 20, a single gasket body 30, and a single compliant interlayer 40. The seal prevents flow of a fluid through the junction from outside of the conduits to the inside of the joined conduits, or from the inside of the conduits to the outside of the joined conduits. The sealing surface of the ceramic conduit and the sealing surface of the metal conduit may be at least essentially parallel to each other and/or separated by a distance equal to the thickness of the compressed gasket body and compliant interlayer.

The ceramic conduit 10 may be constructed of any ceramic known for use in ion transport membrane devices, for example, single phase multicomponent metal oxides or multiphase composite materials. Examples of single phase multicomponent metal oxides include mixed oxygen ion and electron conducting perovskites and doped lanthanum nickelates. Examples of multiphase composite materials include two phase mixtures of an ionic conductor such as a fluorite with an electronic conductor such as a perovskite. Examples of mixed oxygen ion and electron conducting perovskites include compositions in the $Ln_xA'_{x'}A''_{x''}B_yB'_{y'}B''_{y''}O_{3-z}$ where Ln is selected from La and the lanthanide elements; A' is selected from the alkaline earth elements, and A'' is independently selected from La, the lanthanide elements and the alkaline earth elements; B, B' and B'' are independently selected from the first row transition metals, Al, Ga and Mg; $0 \le x \le 1, 0 \le x' \le 1; 0 \le x'' \le 1; 0 < y \le 1; 0 \le y' \le 1; 0 \le y'' \le 1; x+x'+x''=1; 0.9 < y+y'+y'' < 1.1$; and z is a number to make the compound charge neutral.

The metal conduit 20 may be constructed of any metal known for use in ion transport membrane devices. Suitable metals may include, for example, Incoloy® 800H, Incoloy® 800, Incoloy® 800HT, 253MA, 353MA, Haynes® 230, Haynes® 214, Haynes® HR-120, Inconel® 600, Inconel® 601, and Inconel® 602 CA.

The gasket body 30 defines a first surface and a second surface, the second surface opposing the first surface. The first surface of the gasket body directly contacts the sealing surface 15 of the ceramic component 10. The gasket body needs to possess the ability to accommodate shear strain acting parallel to the plane of the seal surface (parallel to the sealing surfaces of the metal and ceramic conduits). Thus, the material either must have a low coefficient of friction when placed in contact with either the ceramic body or the compliant layer, or it must possess a structure that allows it to undergo shear strain at low stress.

The gasket body comprises a mineral selected from the group consisting of mica, vermiculite, montmorillonite, graphite, and hexagonal boron nitride. The gasket body may comprise at least 95 weight % of a mineral selected from the group consisting of mica, vermiculite, montmorillonite, graphite, and hexagonal boron nitride. The gasket body may be mica paper, vermiculite paper, talc-infiltrated vermiculite paper, or boron nitride sheet. The gasket body may be, for example, *Flexitallic Thermiculite*™ 866.

If mica paper is used, the mica paper may include a binder or the mica paper may be binderless. If vermiculite paper is used, the vermiculite paper may include a binder or the vermiculite paper may be binderless.

The term "mica" encompasses a group of complex aluminosilicate minerals having a layered structure with varying chemical compositions and physical properties. More particularly, mica is a complex hydrous silicate of aluminum, containing potassium, magnesium, iron, sodium, fluorine, and/or lithium, and also traces of several other elements. It is stable and completely inert to the action of water, acids (except hydro-fluoric and concentrated sulfuric) alkalies, conventional solvents, oils, and is virtually unaffected by atmospheric action. Stoichiometrically, common micas can be described as follows:

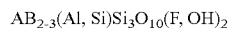

$$AB_{2-3}(Al, Si)Si_3O_{10}(F, OH)_2$$

where A=K, Ca, Na, or Ba and sometimes other elements, and where B=Al, Li, Fe, or Mg. Although there are a wide variety of micas, the following six forms make up most of the common types: Biotite, $(K_2(Mg, Fe)_2(OH)_2(AlSi_3)_{10}))$, Fuchsite (iron-rich Biotite), Lepidolite $(LiKAl_2(OH, F)_2(Si_2O_5)_2)$, Muscovite $(KAl_2(OH)_2(AlSi_3O_{10}))$, Phlogopite $(KMg_3Al(OH)Si_4O_{10}))$ and Zinnwaldite (similar to Lepidolite, but iron-rich). Mica can be obtained commercially in either a paper form or in a single crystal form, each form of which is encompassed by various embodiments of the invention. Mica in paper form is typically composed of mica flakes and a binder, such as for example, an organic binder such as a silicone binder or an epoxy, and can be formed in various thicknesses, often from about 50 microns up to a few millimeters. Mica in single crystal form is obtained by direct cleavage from natural mica deposits, and typically is not mixed with polymers or binders.

The first surface of the gasket body may be at least essentially parallel to the second surface of the gasket body. The gasket body may have a thickness of 0.025 mm to 0.26 mm.

The gasket body, as part of the seal, prevents the flow of fluid through the junction, i.e. it "seals."

The gasket body, which is in contact with the sealing surface of the ceramic conduit, is a "shear layer" or "slip layer" that possesses the characteristic of lubricity or is a sheet-like structure in which the sheets can be displaced across (parallel to) one another. In this way, the shear layer accommodates the differences in thermal and chemical expansion of the metal and ceramic conduits. A second function of the gasket body is to form a protective boundary between the relatively reactive ceramic and other materials in the seal. The gasket body serves as a barrier to prevent adhesion, bonding, and chemical reaction between the compliant interlayer and the ceramic conduit.

The compliant interlayer 40 is disposed between and directly contacting the second surface of the gasket body 30 and the sealing surface 25 of the metal component 20. The compliant interlayer comprises a member selected from the group consisting of a glass, a glass-ceramic, a glass composite, a cermet, a metal, a metal alloy, and a metal composite. The compliant interlayer preferably does not contact the sealing surface 15 of the ceramic component 10.

As used herein, the term "compliant" is intended to refer to a property of the material whereby, under operating conditions of the ion transport membrane device, the material has a degree of plastic deformation under a given compressive force so that it conforms to adjacent surfaces to block gas leakage pathways through the junction. Such gas leakage pathways can result, for example, from defects in the adjacent surfaces of the components, or other irregularities in the surfaces including grooves on a metal component or grooves or voids on a ceramic component.

The compliant layer's main function is to accommodate both irregularities in the sealing surface of the metal conduit and the gasket body, as well as larger scale deviations from flatness in the sealing surface of the ceramic conduit.

To make the seal, the compliant interlayer can be applied to the gasket body in a variety of manners, including, for example and without limitation, dip-coating, painting, screen printing, deposition, spattering, tape casting, and sedimentation. In addition, the compliant interlayer material can be provided in a variety of forms, including, for example, as fibers, granules, powders, slurries, liquid suspensions, pastes, ceramic tapes, metallic foils, metallic sheets, and others.

The compliant interlayer 40 may be a metal comprising at least 95 weight % of gold, silver, palladium, or alloys thereof.

The compliant interlayer may comprise at least 95 weight % of a glass, or a glass-ceramic which can advantageously be a machineable ceramic like Macor®.

The compliant interlayer may have a thickness of 0.025 mm to 1.27 mm prior to heating. If either the metal sealing surface or the ceramic sealing surface is not perfectly flat, the compliant layer must be sufficiently thick to accommodate any unevenness.

The thickness dimension of the gasket body and the compliant interlayer is the dimension normal to the sealing surfaces of the conduits.

The width dimension of the gasket body and the compliant interlayer corresponds to the thickness dimension of the conduit walls.

The width of the gasket body may be greater than, less than, or equal to the width of the compliant interlayer. The width of the gasket body may be greater than, less than, or equal to the thickness of the ceramic conduit wall. The width of the gasket body may be greater than, less than, or equal to the thickness of the metal conduit wall. The thickness of the ceramic conduit wall may be greater than, less than, or equal to the thickness of the metal conduit wall. The width of the compliant interlayer may be greater than, less than, or equal to the thickness of the ceramic conduit wall. The width of the compliant interlayer may be greater than, less than, or equal to the thickness of the metal conduit wall.

To seal a junction between a metal conduit and a ceramic conduit, a bi-layer seal as disclosed herein is positioned between the sealing surface of the metal conduit and the sealing surface of the ceramic conduit such that the gasket body is positioned against the sealing surface of the ceramic conduit and the compliant interlayer is positioned between the gasket body and the sealing surface of the metal conduit. Sealing is then accomplished by applying a compressive force normal to the sealing surfaces, both to maintain the seal elements in their proper positions and to cause the compliant interlayer to mold to surface defects in the surface of the metal conduit and the gasket body under operating conditions of the device. The compressive force may be provided entirely by the pressure differential between the high- and low-pressure sides of the device (i.e. without mechanical means). Any suitable geometry may be used to create the compressive force by the pressure differential. The resulting compressive stress during operation or use may be from about 34.5 kPa (5 psi) to about 13.8 MPa (2000 psi), or from about 34.5 kPa (5 psi) to about 3446 kPa (500 psi), or from about 69 kPa (10 psi) to about 2757 kPa (400 psi), or from about 103.5 kPa (15 psi) to about 2068 kPa (300 psi).

The present seal may be conveniently used to connect a circular cross-section sealing surface of a ceramic conduit (like a flange) to a similar sealing surface of a metal conduit. For this type of application, the gasket body and the compliant interlayer may be washer-shaped. For a given compressive force, decreasing the sealing area increases the compressive force per unit area acting on the seal. However, making the gasket narrower shortens the threshold distance for leakage through the seal. For this reason, there typically exists an optimum sealing area and it is generally not desirable that the gasket body and compliant interlayer have the same internal and external diameter as one another, or as the conduits. Instead, the gasket body and compliant interlayer should be sized to optimize the balance of compressive force per unit sealing area (which is the smaller of the gasket body, the compliant interlayer or one of the flange areas), the minimum seal dimension (distance between the high and low pressure gases), cost of seal components, and other considerations specific to the system being sealed.

EXAMPLE

Figures 2, 3:
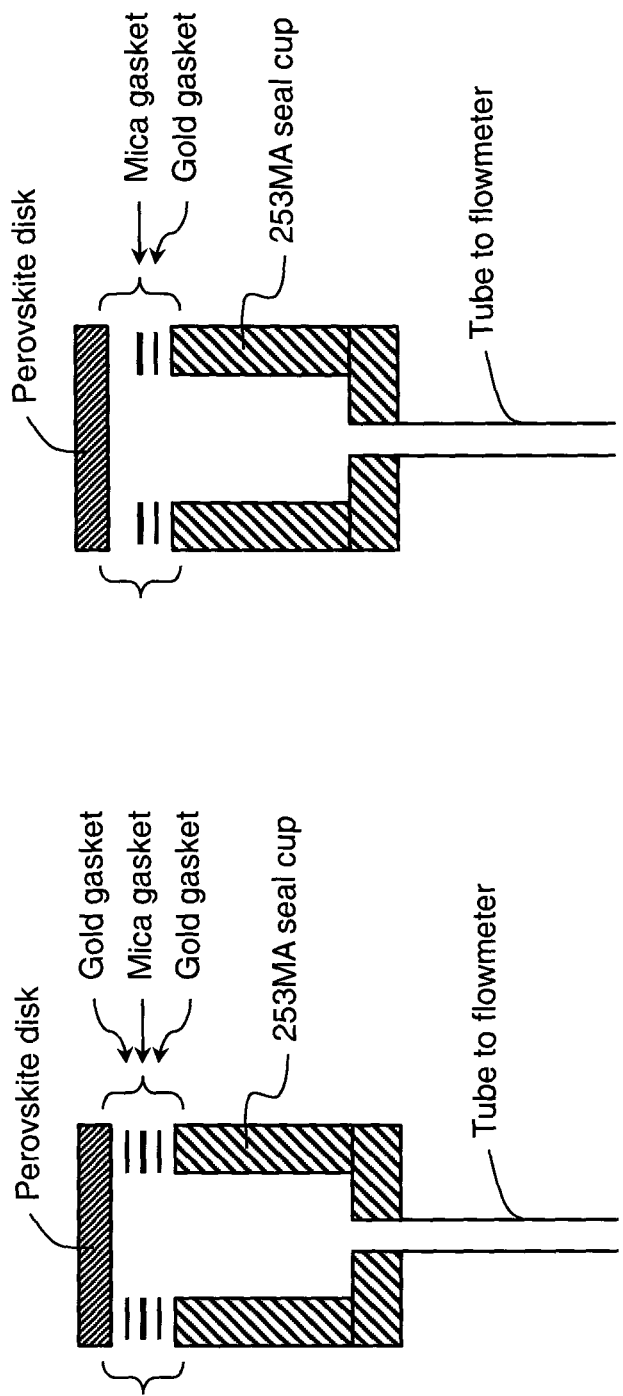
FIG. 2 is an exploded view of a tri-layer seal for samples 1 and 2 of the example.
FIG. 3 is an exploded view of a bi-layer seal for samples 3 and 4 of the example.

Samples were tested to compare the sealing performance of bi-layer seals and tri-layer seals. Each sample was prepared by stacking washer-shaped compliant interlayer(s) and a washer-shaped gasket body between an alloy 253MA seal cup and a perovskite disk as shown in exploded view in FIG. 2 and FIG. 3. In this example, the 253MA seal cup functions as a metal conduit and the perovskite disk functions as a ceramic conduit. This geometry, like that of an ion transport membrane device, allows for the pressure differential between the high- and low-pressure sides of the seal cup to provide the compressive force on the seal; the conduit and seal are containing an external pressure. The perovskite was $La_{0.4}Sr_{0.6}CoO_{3-\delta}$ where $\delta$ is a number needed to make the compound charge neutral.

Samples 1 and 2 were tri-layer seals consisting of two gold compliant interlayers with a phlogopite mica paper gasket body. The phlogopite mica paper gasket body is sandwiched between the two gold compliant interlayers. One of the gold compliant interlayers contacts the sealing surface of the alloy 253MA seal cup and the other gold compliant interlayers contacts the sealing surface of the perovskite disk as shown in FIG. 2(a).

Samples 3 and 4 were bi-layer seals consisting of one gold compliant interlayer and a phlogopite mica paper gasket body. The phlogopite mica paper gasket body directly contacts the sealing surface of the perovskite disk. The gold compliant interlayer directly contacts the sealing surface of the alloy 253MA seal cup and the phlogopite mica paper gasket body as shown in FIG. 2(b).

The gold compliant interlayers were each washer-shaped having a 3.6 cm outer diameter, a 2.8 cm inner diameter, and 0.076 mm thickness. The phlogopite mica paper gasket bodies were each washer-shaped having a 3.6 cm outer diameter, a 2.8 cm inner diameter, and 0.102 mm thickness. The perovskite disk had a 3.81 cm outer diameter.

The samples were placed in a pressure vessel in a cylindrical furnace and were heated to 870° C. and subsequently the furnace pressurized with air to 1.65 MPa (absolute). The pressure differential between the high-pressure side (outside the seal cup) and low-pressure side (inside the seal cup) provided the compressive force on the seal. The samples were held under these conditions for a dwell time as indicated in Table 1. The furnace was then depressurized (typically to 163 kPa (9 psig)) and then cooled to less than 40° C. before starting the next cycle. The interior of the seal cup was vented to atmosphere via a flow meter, which measured the leak rate of the seal and perovskite disk (the leak rate through the seal expected to dominate except if the perovskite disk fails). Each of the samples underwent 6 cycles as indicated in Table 1. The leak rate of air through the seal and the perovskite was measured continuously. Table 1 summarizes the results of the experiment in terms of the average leak rate during each cycle.

The tri-layer seals provided better initial performance with leak rates of 63 to 67 sccm (where the unit "sccm" is defined as mL/min at 0° C. and 1 atm absolute pressure) compared to 119 and 187 sccm for the bi-layer seals. However, after several thermal and pressure cycles, the bi-layer seals remain robust, with little change in performance. Of the two tri-layer seals, sample 1 remained robust as well, but sample 2 showed a significant performance decline. For sample 2, the leak rate was beyond the scale of the flow meter during the fourth cycle. During the sixth cycle, the leak rate was high enough to trip the excess flow valve on the system, which meant that the leak rate was roughly 2000 sccm or higher.

These experiments illustrate that bi-layer seals can provide suitable sealing as compared to tri-layer seals. In terms of long-term performance, for example over the life of the device using the seal, the bi-layer seals may be preferable because the compliant interlayer (e.g. gold) in a tri-layer seal may diffuse or otherwise react with the ceramic, thereby degrading the seal.

TABLE 1

| | | Leak Rate (sccm) | | | |
|---|---|---|---|---|---|
| Cycle | Dwell (h) | Sample 1 | Sample 2 | Sample 3 | Sample 4 |
| 1 | 336 | 67 | 63 | 187 | 119 |
| 2 | 336 | 50 | 109 | 118 | 104 |
| 3 | 0 | 55 | 720 | 123 | 119 |
| 4 | 0 | 58 | >930 | 132 | 128 |
| 5 | 336 | 46 | >930 | 109 | 98 |
| 6 | 168 | 69 | Failed | 131 | 118 |

We claim:

1. A seal between a ceramic conduit and a metal conduit, the seal comprising:
    a sealing surface of the ceramic conduit;
    a sealing surface of the metal conduit;
    a gasket body defining a first surface and a second surface, the second surface opposing the first surface, the first surface of the gasket body directly contacting the sealing surface of the ceramic conduit; and
    a compliant interlayer disposed between the second surface of the gasket body and the sealing surface of the metal conduit, the compliant layer directly contacting the sealing surface of the metal conduit;
    wherein the gasket body comprises a mineral selected from the group consisting of mica, vermiculite, montmorillonite, and hexagonal boron nitride; and
    wherein the compliant interlayer comprises a material selected from the group consisting of a cermet, a metal, a metal alloy, and a metal composite.

2. The seal of claim 1 wherein the seal consists of:
    the sealing surface of the ceramic conduit;
    the sealing surface of the metal conduit;
    the gasket body, wherein the gasket body is a single gasket body; and
    the compliant interlayer, wherein the compliant interlayer is a single compliant interlayer;
    wherein the compliant interlayer directly contacts the second surface of the gasket body.

3. The seal of claim 2
    wherein the gasket body comprises at least 95 weight % of a mineral selected from the group consisting of mica, vermiculite, montmorillonite, and hexagonal boron nitride;
    wherein the first surface of the gasket body is at least essentially parallel the second surface of the gasket body;
    wherein the gasket body separates the sealing surface of the ceramic conduit from the compliant interlayer;
    wherein the gasket body has a thickness of 0.025 mm to 0.26 mm;
    wherein the compliant interlayer is a metal comprising at least 95 weight % of gold, silver, palladium, or alloys thereof;
    wherein the compliant interlayer has a thickness of 0.025 mm to 1.27 mm prior to heating; and
    wherein the compliant interlayer does not contact the sealing surface of the ceramic conduit.

4. The seal of claim 2
    wherein the gasket body is mica paper, vermiculite paper, talc-infiltrated vermiculite paper, or hexagonal boron nitride sheet;
    wherein the first surface of the gasket body is at least essentially parallel the second surface of the gasket body;

wherein the gasket body separates the sealing surface of the ceramic conduit from the compliant interlayer;
wherein the gasket body has a thickness of 0.025 mm to 0.26 mm;
wherein the compliant interlayer is a metal comprising at least 95 weight % of gold, silver, palladium, or alloys thereof;
wherein the compliant interlayer has a thickness of 0.025 mm to 1.27 mm prior to heating; and
wherein the compliant interlayer does not contact the sealing surface of the ceramic conduit.

5. The seal of claim 1
wherein the gasket body comprises at least 95 weight % of a mineral selected from the group consisting of mica, vermiculite, montmorillonite, and hexagonal boron nitride;
wherein the first surface of the gasket body is at least essentially parallel the second surface of the gasket body;
wherein the gasket body separates the sealing surface of the ceramic conduit from the compliant interlayer;
wherein the gasket body has a thickness of 0.025 mm to 0.26 mm;
wherein the compliant interlayer is a metal comprising at least 95 weight % of gold, silver, palladium, or alloys thereof;
wherein the compliant interlayer has a thickness of 0.025 mm to 1.27 mm prior to heating; and
wherein the compliant interlayer does not contact the sealing surface of the ceramic conduit.

6. The seal of claim 1
wherein the gasket body is mica paper, vermiculite paper, talc-infiltrated vermiculite paper, or hexagonal boron nitride sheet;
wherein the first surface of the gasket body is at least essentially parallel the second surface of the gasket body;
wherein the gasket body separates the sealing surface of the ceramic conduit from the compliant interlayer;
wherein the gasket body has a thickness of 0.025 mm to 0.26 mm;
wherein the compliant interlayer is a metal comprising at least 95 weight % of gold, silver, palladium, or alloys thereof;
wherein the compliant interlayer has a thickness of 0.025 mm to 1.27 mm prior to heating; and
wherein the compliant interlayer does not contact the sealing surface of the ceramic conduit.

7. The seal of claim 1 wherein the gasket body comprises at least 95 weight % of a mineral selected from the group consisting of mica, vermiculite, montmorillonite, and hexagonal boron nitride.

8. The seal of claim 1 wherein the gasket body is mica paper, vermiculite paper, talc-infiltrated vermiculite paper, or hexagonal boron nitride sheet.

9. The seal of claim 1 wherein the compliant interlayer does not contact the sealing surface of the ceramic conduit.

10. The seal of claim 1 wherein the first surface of the gasket body is at least essentially parallel the second surface of the gasket body.

11. The seal of claim 1 wherein the gasket body has a thickness of 0.025 mm to 0.26 mm.

12. The seal of claim 1 wherein the compliant interlayer is a metal comprising at least 95 weight % of gold, silver, palladium, or alloys thereof.

13. The seal of claim 1 wherein the compliant interlayer has a thickness of 0.025 mm to 1.27 mm prior to heating.

14. The seal of claim 1 wherein the gasket body separates the sealing surface of the ceramic conduit from the compliant interlayer.

15. The seal of claim 1 wherein the gasket body is a shear layer or slip layer that possesses the characteristic of lubricity or is a sheet-like structure comprising sheets or flakes which can be displaced relative to one another in directions which are at least essentially parallel to the sheets or flakes.

16. The seal of claim 1 wherein the ceramic conduit is constructed of one or more single phase multicomponent metal oxides and/or of one or more multiphase composite materials.

* * * * *